United States Patent
Nguyen et al.

(10) Patent No.: US 10,735,179 B2
(45) Date of Patent: Aug. 4, 2020

(54) AUTOMATIC INSERTION OF MASKING INTO AN ALGORITHM

(71) Applicant: SECURE-IC SAS, Cesson-Sévigné (FR)

(72) Inventors: Philippe Nguyen, Rennes (FR); Sylvain Guilley, Paris (FR)

(73) Assignee: SECURE-IC SAS, Cesson-Sévigné (FR)

( * ) Notice: Subject to any disclaimer, the term of this patent is extended or adjusted under 35 U.S.C. 154(b) by 262 days.

(21) Appl. No.: 15/898,327

(22) Filed: Feb. 16, 2018

(65) Prior Publication Data

US 2018/0248682 A1    Aug. 30, 2018

(30) Foreign Application Priority Data

Feb. 24, 2017 (EP) ..................................... 17305202

(51) Int. Cl.
*H04L 29/06* (2006.01)
*H04L 9/00* (2006.01)
(Continued)

(52) U.S. Cl.
CPC .............. *H04L 9/002* (2013.01); *G06F 21/75* (2013.01); *G06F 21/755* (2017.08); *H04L 9/003* (2013.01);
(Continued)

(58) Field of Classification Search
CPC ......... H04L 9/002; H04L 9/003; H04L 9/008; H04L 9/0631; H04L 2209/04;
(Continued)

(56) References Cited

U.S. PATENT DOCUMENTS 6,842,862 B2 *   1/2005   Chow ..................... G06F 21/14
                                                              713/165
8,091,139 B2 *   1/2012   Klimov ................. G06F 21/556
                                                              380/252
(Continued)

OTHER PUBLICATIONS

Rivain et al., "Provably secure higher-order masking of AES", In International Workshop on Cryptographic Hardware and Embedded Systems, Springer, Berlin, Heidelberg, Aug. 17, 2010, pp. 413-427.
(Continued)

*Primary Examiner* — Sarah Su
(74) *Attorney, Agent, or Firm* — Meagher Emanuel Laks Goldberg & Liao, LLP

(57) ABSTRACT

A computer implemented method, program product, and system implementing said method, for transforming a call graph representation of an algorithm into a secured call graph representation of said algorithm. The call graph comprises inputs (a, b, f), internal variables being the edges of the graph (c, d, e), elementary functions being the nodes of the graph, said functions being either linear or not linear, and outputs (g), the method comprising:
  a step of masking each input of the call graph,
  a step of replacing each unmasked internal variable of the call graph with a masked variable,
  a step of replacing at least each non-linear function of the call graph with an equivalent function that applies to masked variables,
  a step of unmasking each output of the call graph.

11 Claims, 8 Drawing Sheets

(51) Int. Cl.
*H04L 9/06* (2006.01)
*G06F 21/75* (2013.01)

(52) U.S. Cl.
CPC ............ *H04L 9/008* (2013.01); *H04L 9/0631* (2013.01); *G06F 2207/7233* (2013.01); *G06F 2207/7238* (2013.01); *H04L 2209/04* (2013.01); *H04L 2209/046* (2013.01)

(58) Field of Classification Search
CPC . H04L 2209/046; G06F 21/755; G06F 21/75; G06F 2207/7233; G06F 2207/7238
See application file for complete search history.

(56) References Cited

U.S. PATENT DOCUMENTS

| | | | |
|---|---|---|---|
| 8,577,025 B2* | 11/2013 | Fumaroli | G06F 21/77 380/28 |
| 8,971,526 B2* | 3/2015 | Coron | H04L 9/003 380/28 |
| 2013/0238149 A2* | 9/2013 | Yasni | F01K 13/02 700/286 |
| 2014/0165049 A1* | 6/2014 | Diamos | G06F 8/443 717/156 |
| 2014/0337639 A1* | 11/2014 | Probert | H04L 9/3242 713/189 |
| 2014/0344924 A1* | 11/2014 | McLachlan | G06F 21/629 726/22 |

OTHER PUBLICATIONS

Moss et al., "Compiler assisted masking", In International Workshop on Cryptographic Hardware and Embedded Systems, Springer, Berlin, Heidelberg, Sep. 9, 2012, pp. 58-75.
Eldib et al., "Synthesis of masking countermeasures against side channel attacks", In International Conference on Computer Aided Verification, Springer, Cham, Jul. 18, 2014, pp. 114-130.
Coron et al., "Higher-order side channel security and mask refreshing", In International Workshop on Fast Software Encryption, Springer, Berlin, Heidelberg, Mar. 11, 2013, pp. 410-424.
European Search Report for 17305202.8 dated Sep. 8, 2017.

* cited by examiner

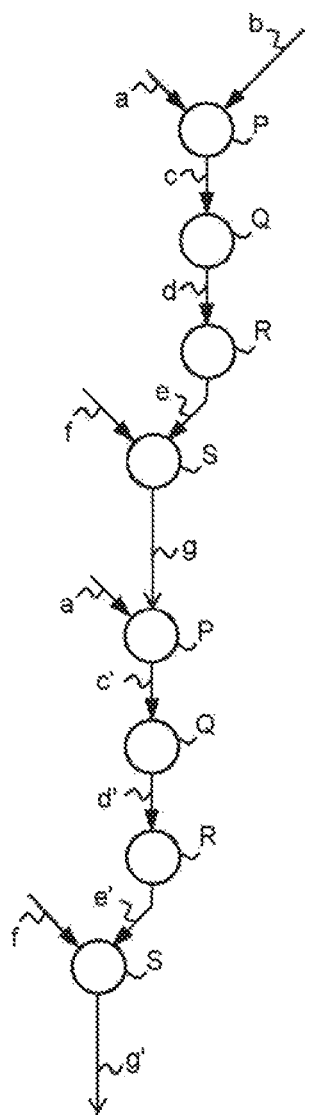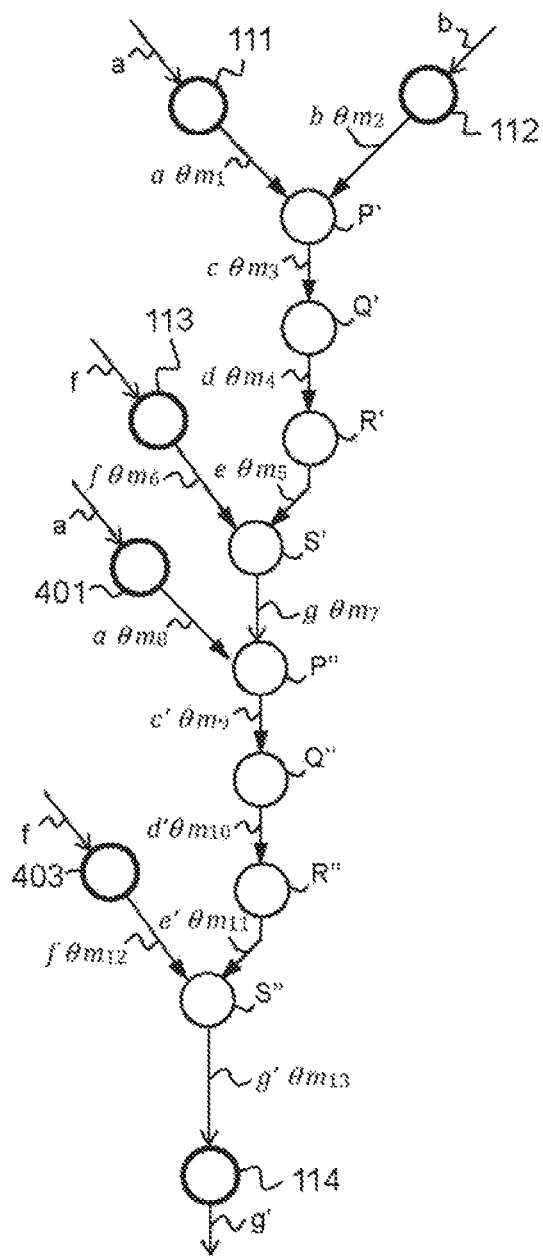
PRIOR ART
FIG.4a
FIG.4b

Graph of AES ROUND

AUTOMATIC INSERTION OF MASKING INTO AN ALGORITHM

FIELD OF THE INVENTION

The present invention applies to the field of cryptography, and concerns more specifically a method for protecting the implementation of an algorithm against side-channel attacks.

BACKGROUND PRIOR ART

Existing encryption algorithms, involving ciphering of sensitive data, provide effective robustness against crypt-analysis and contents recovery attacks. These techniques are called "black box techniques", as the attacker only has knowledge of the inputs and outputs of the encryption algorithm. Most of the encryption algorithms are standardised, one of the most used being known is the Advanced Encryption Standard (AES). The confidentiality of the encryption is based on a shared secret ciphering key. The best option for an attacker ignoring the secret key is to try all the possible combinations (brute force decoding). When the key is 128 bits or 256 bits long, the number of iterations required makes a brute force decoding computationally very difficult to manage.

However, some attacks, called side-channel attacks (SCA), give an attacker the opportunity to retrieve secret information executed in the encryption algorithm based on information that leaks from its physical implementation, like timing information, power consumption, electromagnetic leaks, etc. ...

There is thus a first need to provide a method for protecting the implementation of sensitive algorithms against such attacks.

Any algorithm can be represented as a graph of operations, or call graph, which is a directed graph wherein each node is a function and each edge is an intermediate variable (also referred as internal variable). This call graph can also be referred as a data flow graph, or a control flow graph.

A function can be a single operation, or a combination, linear or not, of operations. It is a straight-line piece of code without any jumps. When a function comprises a plurality of operands, it can be decomposed in a plurality of unary or binary operands.

Typical operations are those which can be implemented in a given technology. For instance, software programs can compute arithmetic and logic operations, such as additions ('+'), or exclusive boolean OR ('XOR'). Digital Signal Processors (DSP) or Field Programmable Gate Array (FPGA) can compute any function implemented in look-up-tables (LUT) or arithmetic operations using MAC units (Multiply-ACcumulate). Application Specific Integrated Circuits (ASIC) can take advantage of standard cell libraries to compute any type of operation.

A function can be expressed in a high level language, but can also be mapped as a sequence of operations. It is the compiler's role to transform such a function, potentially described in a high level language, into a machine language, optimising the processing times and resources consumption.

A graph representing an algorithm is a directed graph: each node or function has as many entering edges as input arguments and as many outgoing edges as output results. For example, if the function is a mere binary operation (with two arguments and one result), there are two inputs and one output.

The edges carry typed variables, which are passed from node to node. The type can be a byte, a 32-bit word, etc. ...

It is an object of the invention to consider a sensitive algorithm, such as a cryptographic algorithm, described as a call graph and to transform the algorithm so as to protect it against side-channel attacks, regardless of the type of algorithms or of any considerations about its implementation.

To increase the robustness of an algorithm against side channel attacks, it is known to mask the sensitive data of the algorithm. One example of masking is based on secret sharing, which consists in splitting an initial variable in a plurality of new variables, so that the sum of the new variables yields the initial variable. The sum must be understood according to the underlying type of the variables. For instance, when the variable is a byte, the sum can be a bitwise XOR, or an addition modulo 256.

When the operations affecting the masked data are linear functions, the value of the masked output of the function can be calculated from the masked input. However, when the functions are non-linear (as for example power function, substitution box of cryptographic algorithm, . . . ), the mask calculation might be impossible. The mask must be removed at the input of the function, and a new mask inserted at the output of the function.

Various masking techniques are known, some of them are proven. They apply to straight line programs, which are linear call graphs. The masking consists in chaining operations, with, whenever appropriate, a random resharing (or refreshing) of the masks between operations. However, when the graph is not in straight line, some vulnerability might show up.

In M. Rivain and E. Prouff, Provably secure higher-order masking of AES, CHES 2010, pages 413-427, is presented a complete masked AES algorithm. In this paper, the masking of specific linear and non-linear functions is described, and the functions are chained in order to describe a complete AES algorithm. However, as indicated in J E. Coron, E. Prouff, M. Rivain and T. Roche, High-Order Side Channel Security and Mask Refreshing, FSE 2013, pages 11-13, even with an approach specifically dedicated to the AES algorithm, some implementation issues can arise. These implementation issues come from the reuse of some variables, hence the achieved security level decreases.

Thus, today, most of the masking implementations are done manually, which is prone to implementation errors (as for instance sensitive variables not being masked). Only a few studies are considering automatic masking.

Amongst these studies is the article of A. Moss, E. Oswald, Compiler assisted masking, Cryptographic Hardware and Embedded Systems, CHES 2012, p 58-75. In this article, sensitive data are annotated by the programmer, and their secrecy is treated as a value in a lattice allowing the compiler to propagate secrecy information through the program. Once compiled, the secret data never appear in plain text during the program execution, thereby guaranteeing the secrecy of the masked data, in particular against side channel attacks. The algorithm then performs a step of searching for sensitive information leakages in every value in the program, in particular in temporary variables introduced when converting expressions, and, when a leakage occurs, attempts to prevent the leakage using a set of program transformations.

The drawback of the solution exposed in this article is that it applies only to first-order Boolean masking schemes, and to straight-line code. Moreover, the step of searching for leakage and transforming the program to prevent such leakage is not bound to converge.

In Eldib H., Wang C., Synthesis of masking countermeasures against side channel attacks, Computer aided verification (pp. 114-130), Springer International Publishing, January 2014, it is proposed to mask an entire algorithm, including all the intermediate values. To cope with non-linear functions, it is proposed to determine a functionally equivalent linear function, and to verify that the function is equivalent for all possible inputs, and is perfectly masked.

This method has similar drawbacks as the method of Moss et al., as it only applies on call graphs of Boolean types, which reduces the scope to hardware implementations. In addition, the method follows a trial and error methodology, whose execution time is not guaranteed.

There is accordingly a more precise need for a fully automatic and robust method to transform an unprotected algorithm into a secure version of said algorithm.

SUMMARY OF THE INVENTION

In order to address this and other problems, there is provided a computer implemented method for transforming a call graph representation of an algorithm into a secured call graph representation of said algorithm. The call graph comprises one or more input, one or more edge (c, d, e), one or more node (P, Q, R, S) and one or more output (g). The edges of the call graph represent internal variables (or intermediate variables) of said algorithm, and the nodes of the call graph represent linear or non-linear elementary functions of the algorithm. The computer implemented method according to the invention comprises:
- a step of masking each input of the call graph,
- a step of replacing each unmasked internal variable of the call graph with a masked variable,
- a step of replacing at least each non-linear function of the call graph with an equivalent function that applies to masked variables,
- a step of unmasking each output of the call graph.

The method advantageously applies to both linear and non-linear call graphs, with a limited and deterministic execution time, and is not limited to Boolean type of operations.

The transformation of the unprotected algorithm into a secure version of said algorithm meets two required properties:
- Preserve the semantic, i.e. compared with the original program, the same results are obtained from a set of determined inputs, and
- Mask all the intermediate variables (that is, variables carried by vertices).

When the call graph comprises parts processed iteratively, the step of replacing unmasked internal variables by masked internal variables may be ensured by identifying internal variables used both as input and output of parts of the call graph processed iteratively, and using for these variables the same mask in input and in output of said part of the call graph.

Alternatively, the step of replacing unmasked internal variables by masked internal variables may be ensured by identifying internal variables used both as input and output of parts of the call graph processed iteratively, and inserting in a feedback edge of said iterative parts additional nodes for modifying the masks of said internal variables.

Advantageously, the masks of internal variables in parts of the call graph processed iteratively may be changed at regular intervals, and the associated functions are modified accordingly. This mechanism can be achieved by inserting in the call graph additional nodes for refreshing the masks of the internal variables of said iterative parts.

In the computer implemented method according to certain embodiments of the invention, the equivalent functions calculated in the step of replacing at least each non-linear function of the call graph with an equivalent function that applies to masked variables may be implemented using match tables. According to one embodiment of the invention, the linear functions of the call graph may be replaced by equivalent functions considering the masks of the input and output internal variables.

According to one embodiment of the invention, some or all the masks values of the secured call graph may be determined randomly.

According to one embodiment of the invention, the computer implemented method may further comprise an additional step of compiling said call graph to produce a protected executable code.

The invention further relates to a computer program product, stored on a non-volatile computer-readable data-storage medium, comprising computer-executable instructions to cause a computer system to carry out a computer implemented method according to any embodiment of the invention, and a non-volatile computer-readable data-storage medium containing computer-executable instructions to cause a computer system to carry out said computer implemented method.

The invention further relates to a system comprising a processor coupled to a memory, the memory storing computer-executable instructions to cause the system to carry out a computer implemented method for transforming a call graph representation of an algorithm into a secured call graph representation of said algorithm. The call graph comprises one or more input, one or more edge (c, d, e), one or more node (P, Q, R, S) and one or more output (g). The edges of the call graph represent internal variables of said algorithm, and the nodes of the call graph represent linear or non-linear elementary functions of the algorithm. The system comprises a processing device configured to:
- mask each input of the call graph,
- replace each unmasked internal variable of the call graph with a masked variable,
- replace at least each non-linear function of the call graph by an equivalent function that applies to the masked variables, and
- unmask each output of the call graph.

BRIEF DESCRIPTION OF THE DRAWINGS

The invention will be better understood and its various features and advantages will emerge from the following description of a number of exemplary embodiments provided for illustration purposes only and its appended figures in which:

FIG. 4a represents an unprotected call graph, where the iterative parts have been unrolled for illustration purposes, FIGS. 4b and 4c represent a call graph protected according to two embodiments of the invention, the mask of internal variables used in iterative parts of the call graph being modified at each iteration, where the iterative parts have been unrolled for illustration purposes.

The examples disclosed in this specification are only illustrative of some embodiments of the invention. They do not in any manner limit the scope of the invention which is defined by the appended claims.

DETAILED DESCRIPTION OF THE INVENTION

Figure 1A:
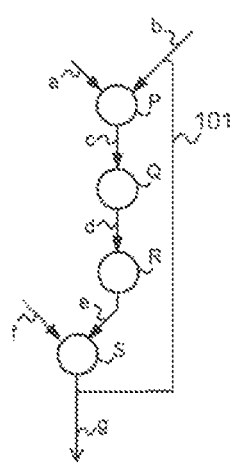
FIG. 1a represents an unprotected call graph as known from the state of the art.

FIG. 1a represents an unprotected call graph as known from the state of the art. This representation is a standard representation for illustration purposes.

The unprotected call graph of FIG. 1a describes the execution of a computer code. It comprises a plurality of nodes (P, Q, R, S), each node relating to a function performed by the code. As previously indicated, each function, represented as a node, can be made of a single operation, or of a combination of operations. The function can be linear or not.

The unprotected call graph also comprises oriented links connecting the output of nodes to input of other nodes, referred to as the edges of the graph. These edges are associated with intermediate variables (c, d, e) that are transmitted from one function to the subsequent functions.

The unprotected call graph further comprises one or more inputs (a, b, f), and one or more outputs (g).

The unprotected call graph also comprises an iterative part 101, the functions P, Q, R and S being processed a plurality of times, the subsequent iterations taking as input the output of the previous iteration.

The call graph is a representation of the interdependency relations of the function during the execution of the program, and interactions required in order to generate the output variable (g) from the input variables (a, b, f). It can be described using various programming languages, as for instance Graphcet, UML (Unified Modeling Language) or HTML (HyperText Markup Language). It can be generated automatically, from the source code using a software like Doxygen© or Eclipse©, or from the compiled code (assembler language, LLVM-IR (Low Level Virtual Machine—Intermediate Representation), VHDL (VHSIC Hardware Description Language), Verilog©, or even generated manually.

Figure 1B:
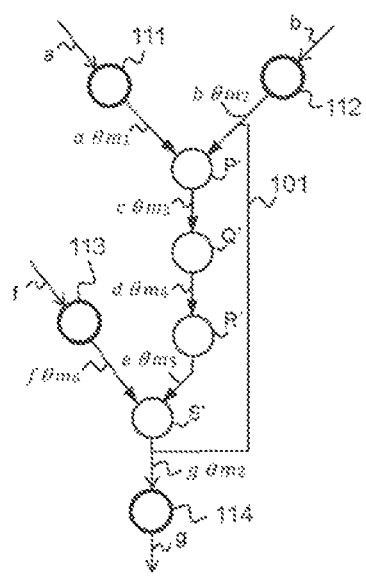
FIGS. 1b and 1c represent a call graph protected according to two embodiments of the invention, advantageously ensuring in particular the consistency of the mask applied to variables used as input and output of iterative parts of the graph.

FIG. 1b represents a call graph protected according to a first embodiment of the invention.

In order to provide robustness against cryptanalysis and content recovery attacks, the invention is based on masking each variable of the program with a mask and, according to some advantageous embodiments of the invention, on changing this mask during the program execution.

To this end, the input variables (a, b, f) are masked (111, 112, 113). The mask values ($m_1$, $m_2$, $m_6$) can be chosen randomly. The masked variables are designated thereinafter as $a \oplus m_1$, $b \oplus m_2$, and $f \oplus m_6$.

Each unmasked internal variables of the call graph (c, d, e) is then replaced by a masked variable ($c \oplus m_3$, $d \oplus m_4$, $e \oplus m_5$). The mask may be chosen randomly, or, when the internal variable is the output of a linear function, inherited accordingly from the masks used for the inputs of the function.

In such embodiment, in order to guaranty the consistency of the protected call graph, when an internal variable is used both as input and output of an iterative part of the graph (as for g in FIG. 1), the mask variable may use the same mask both in input and output of the iterative part. Thus, the mask associated to the variables b and g is the same ($m_2$).

Therefore, the inputs of the function P' are masked equally at each iteration.

After assigning a mask to each input and replacing each unmasked internal variable by a masked variable, the functions (P, Q, R, S) associated to the nodes of the call graph are modified (P', Q', R', S'), in order to comply with the mask value.

When the function is linear and the masking is Boolean, the output masks may be inherited from the input masks. Thus, the function does not require to be modified. Otherwise, the function has to be replaced by an equivalent function that reaches the same result while taking as input masked variables, and masks the output of the function.

When the function is non-linear, it is generally not possible to make a link between the output mask and the input(s) mask(s). Unmasking the input data, processing the function, and masking the result cannot be considered, as unprotected information would appear, and could be considered as a leak of information. Thus, the function may be replaced by a match table that provides all the possible results of the function, the match table being constructed considering the input and output masks. This way, all the variables processed by the algorithm are protected, and no approximations of non-linear function(s) are to be made, in contrast to the prior art.

Finally, the variable that outputs the call graph (g) may be unmasked (114).

In the first embodiment, all the internal variables are accordingly protected and the result of the protected call graph of FIG. 1b is exactly the same as the result of the unprotected call graph of FIG. 1a. Except for masking the inputs and unmasking the output of the program, this first embodiment does not affect the number of nodes of the program. Its final complexity and processing time will be unaffected by the additional protection layer. Once compiled, none of the internal variables will appear unprotected. Thus, the execution of the program is perfectly protected against cryptanalysis and content recovery attacks.

Figure 1C:
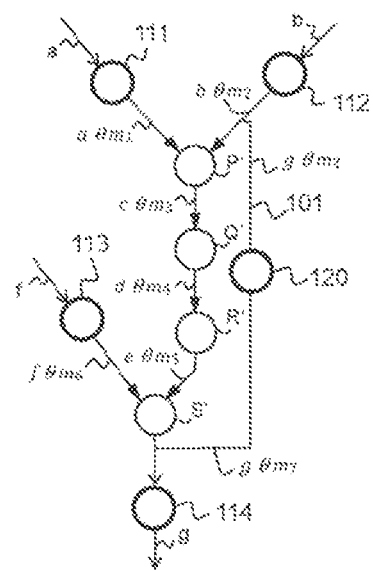

FIG. 1c represents a second embodiment of the invention. In such embodiment, the inputs a, b and f are masked, the unprotected internal variables c, d, e are replaced by protected variables, the functions are modified accordingly, and the output of the call graph g is unmasked, similarly to FIG. 1b.

However, the consistency of the masking concerning the iterative part of the graph is ensured by inserting, in the feedback loop 101 of the iterative part, an additional node 120, which is configured to modify the mask value of the internal variables that are used both as input and output of the iterative part.

In FIG. 1c, the output of the iterative part is replaced by the masked variable $g\oplus m_7$, and node 120 modifies the mask of this variable to transform $g\oplus m_7$ into $g\oplus m_2$. To ensure that the information does not appear unprotected, the input mask $m_2$ is applied before the output mask $m_7$ is removed. As in FIG. 1b, the inputs of the function P' have the same mask at each iteration.

The advantage of the second embodiment compared to the first embodiment is that all masks may be chosen randomly.

Various methods may be used to mask data. The masking can be a simple first order Boolean masking, as for example summing the variable with a secret shared value, a higher order Boolean masking, or any other more elaborated masking technique. One of the advantages of the invention is that it is compatible with any masking technique.

Figure 2A:
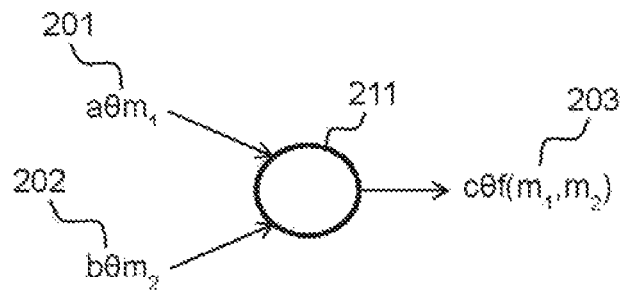
FIGS. 2a and 2b illustrate two ways of processing linear functions.

FIG. 2a illustrates a way of processing linear functions. In such functions, when the masking is Boolean, the mask applied to the output variable(s) 203 depends on the mask applied to the input variable(s) 201 and 202. Thus, the output mask is given by applying the linear function to the input mask. In this example, inputs variables a and b are respectively masked by a value $m_1$ and $m_2$. The output of the function is masked by a value that is the result of the function applied to the masks ($f(m_1, m_2)$). Considering a simplified example, if the function 211 is a multiply function, $f(m_1, m_2)$ is equal to $m_1 * m_2$.

Figure 2B:
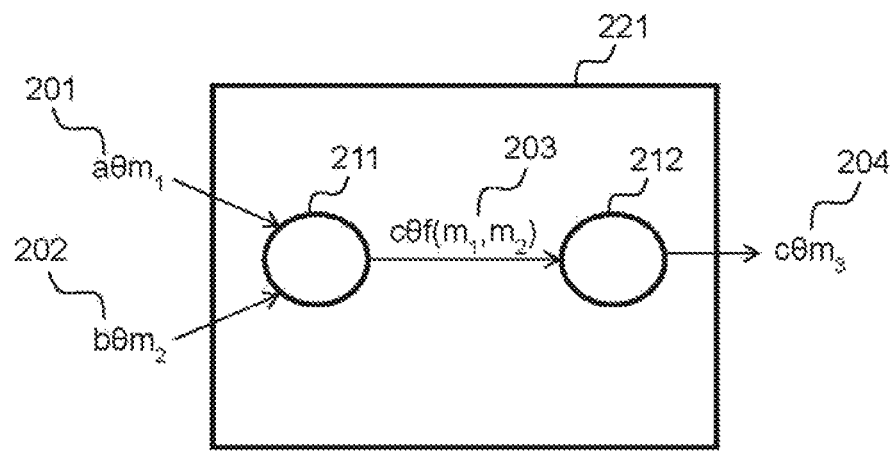

FIG. 2b illustrates an embodiment for processing linear functions when the protected value resulting of the function has a specific mask value.

In such embodiment, two possibilities may be implemented:

Inserting in the call graph an additional node 212, the additional node corresponding to a conversion of the mask affecting the result of the linear function $f(m_1, m_2)$ to the required mask $m_3$. To that end, the function 212 may add the mask $m_3$ to the result of the linear function before removing the mask $f(m_1, m_2)$, or calculating a match table 221 that is equivalent to the linear function taking into account the values of the masks, the match table being stored in memory. This table comprises as inputs all the possible values of $a\oplus m_1$ and $b\oplus m_2$, and associates each of these values with the corresponding value of the output 204 $c\oplus m3$. The match table may be calculated by executing the function 211 and 212 over all possible inputs. This table may be stored enciphered, although it might not be necessary as the data contained in the table do not allow determining any information concerning the original unprotected data processed by the function.

The processing of the linear functions as represented in FIG. 2b allows using random masks for each internal variable of the call graph.

Figure 3:
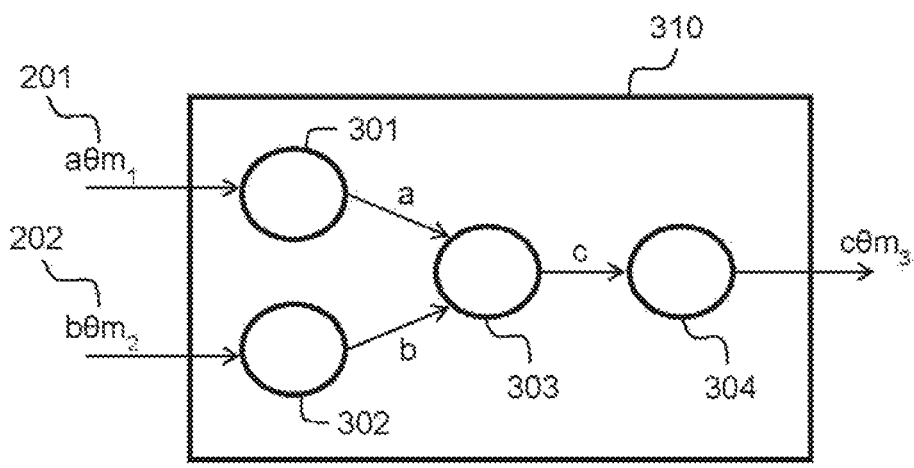
FIG. 3 illustrates one way of processing non-linear functions, by constructing a match table equivalent to said non-linear functions, considering the masked input and outputs.

FIG. 3 illustrates an embodiment for processing non-linear functions. In such embodiment, the processing of the non-linear functions is based on constructing a match table equivalent to said function, considering the masked input and outputs. It should be noted that such processing can also be applied to process linear functions.

Contrary to the linear functions represented in FIGS. 2a and 2b, the mask of the output value cannot be determined from the mask of the input values. For this reason, the non-linear function must be replaced by an equivalent match table 310 that gives the result of the function for every possible set of inputs. The match table may be calculated by unmasking (301 and 302) the input variables $a\oplus m_1$ and $b\oplus m_2$, applying the non-linear function 303, and masking (304) the result of the non-linear function.

All possible input variables may be browsed to construct the table. Thus, the table may be proportional to the number of inputs, the number of outputs, and/or the data size. For instance, considering that inputs a and b are coded over 8 bits, the associated match table is a table that sizes 2^8 (number of possibilities for a)*2^8 (number of possibilities for b)*8 bits (size of c).

FIG. 4a represents the unprotected call graph of FIG. 1a, in an embodiment where the iterative part of the algorithm has been unrolled. In the following description of FIG. 4a, it is considered that the iterative part is only executed twice, for illustration purpose only.

The functions P, Q, R and S are executed twice, the values of the internal variables during the second iteration (c', d', e' and g') being different from the values of the same variables during the first iteration (c, d, e and g).

Figure 4C:
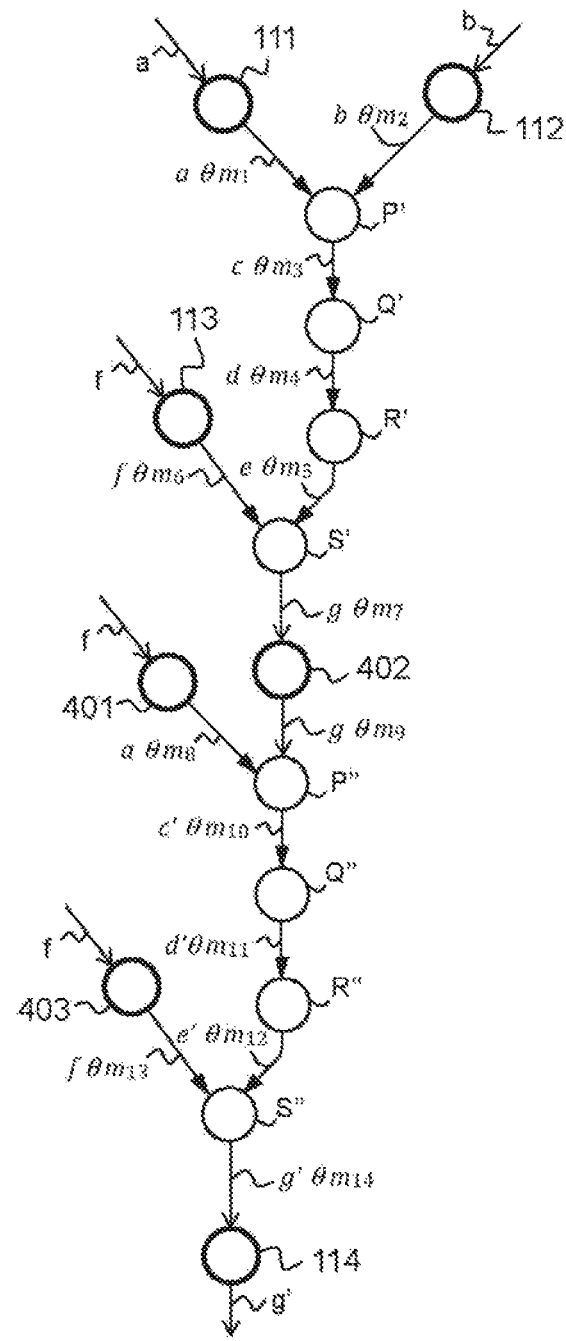

FIGS. 4b and 4c represent a call graph protected according to other embodiments of the invention, the mask of internal variables used in iterative parts of the call graph being modified at each iteration. In the following description of FIGS. 4b and 4c, it is considered that the iterative parts have been unrolled similarly to FIG. 4a.

By refreshing the values of the masks (that is to say by changing the values of the masks) at the end of each iteration, a higher level of protection is obtained, in particular against side channel attacks using the constant aspect of the masks applied.

In FIG. 4b, the first iteration is performed as in FIG. 1b or 1c, by masking each input (a, b and f), replacing each internal variable (c, d, e and g) by a masked variable ($c\oplus m_3$, $d\oplus m_4$, $e\oplus m_5$ and $g\oplus m_7$), and modifying the functions so that they take into account the masked variables (P', Q', R' and S').

For the subsequent iterations, the masks used for the internal variables (c, d, e and g) are modified, and the associated functions modified accordingly. The masks applied to variables used as inputs of the iteration may also be modified. In the example, nodes 111 and 113 applying the masks $m_1$ and $m_6$ to the inputs a and f are changed to nodes 401 and 403 applying new masks $m_8$ and $m_{12}$. The masked variables $c\oplus m_3$, $d\oplus m_4$ and $e\oplus m_5$ are changed to new masked variables $c\oplus m_9$, $d\oplus m_{10}$ and $e\oplus m_{11}$. Function P', taking as inputs variables masked by the masks $m_1$ and $m_2$, is modified into the equivalent function P''', the function P''' taking as inputs the variables masked $m_8$ and $m_7$. If the function P' is a linear function and the output of the function is masked by a mask inherited from the masks of the inputs, P' may remain unmodified. Functions Q', R' and S' are modified into functions Q'', R'' and S'' accordingly.

In an alternative embodiment (not represented), the masks of the inputs a and f may not be modified from one iteration to another.

The call graph can be represented for example in FIG. 1c, using an additional node, such as node 120 in the feedback loop of the iterative part, corresponding to a step of refreshing the mask of all the variables involved in the iteration.

FIG. 4c represents another embodiment, where a node 402 is inserted in the feedback loop of the iteration. This node 402 relates to the step of refreshing all the masks applied to the inputs and variables involved in the iteration. In addition, as represented in FIG. 4c, this node can further change the mask affecting the output of the previous iteration, thereby transforming mask $m_7$ into mask $m_9$.

Figure 5A:
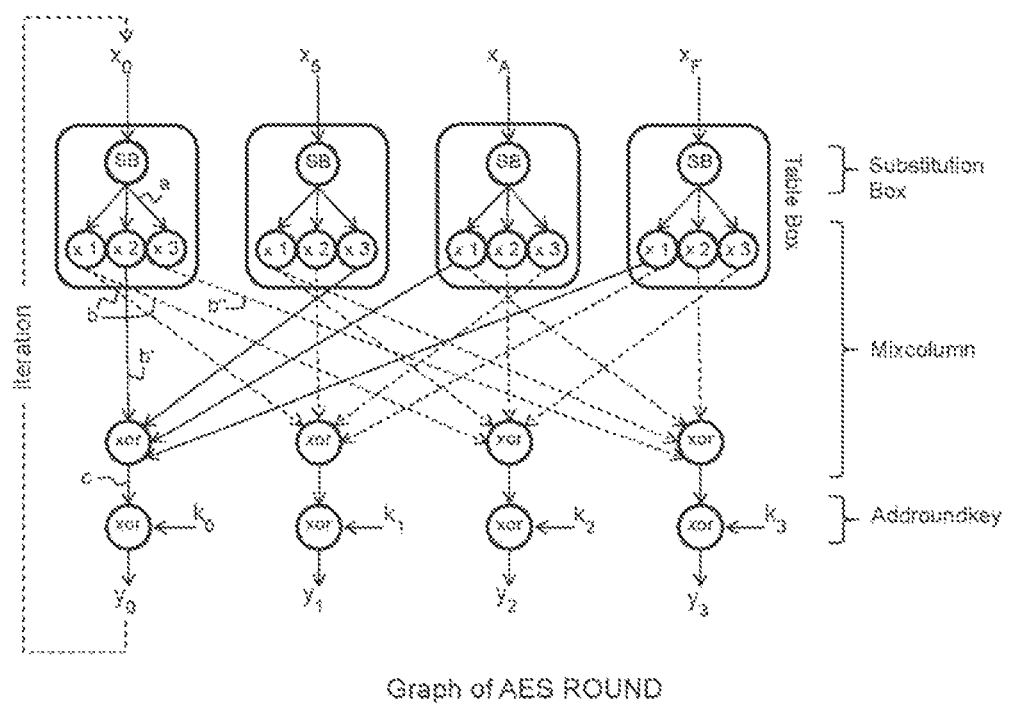
FIG. 5a is a typical call graph representation of an AES algorithm.

FIG. 5a is a call graph representation of an unencrypted AES algorithm. This exemplary representation is used to illustrate the method according to the invention. Such representation is only focused on byte 0 ($x_0$), and on the step of the AES algorithm called the "round step", processed iteratively. In the standard execution of the AES algorithm, the first (pre-processing) and the last (post processing) rounds are particular. These rounds are not represented here, FIG. 5a only focusing on the intermediate rounds of the data path (not representing the processing performed on the AES key $k_i$).

Each round is an iterative process, meaning that the $y_0$ byte, which is the output of one iteration of the round, loops back on $x_0$, which is the input of the round.

In the call graph representation, the circles represent the operation performed on the different variables, while the edges of the graph represent the internal variable. In FIG. 5, there are no inputs or outputs, as they are processed in the first and last iterations of the round (not represented).

The first function applied to $x_0$ in the round is called the substitution box (known as S-box). This substitution is the main element of the algorithm and consists in a bijective non-linear operation performed on $x_0$. The output of the first substitution box is the intermediate variable a in FIG. 5a.

Next function, applied to α, is a set of three linear operations: times 1, times 2 and times 3, performed in a Galois field. Such operations are linear.

The results of these operations, called b, b' and b", are mixed with the results of the corresponding operations performed on bytes 5, 10 and 15 ($x_5$, $x_A$, $x_F$). Such operation is called "Mixcolumn". The mix consists in a XOR operation performed on the four entries. This function is equivalent to three successive XOR operations. The output of the "Mixcolumn" operation is an intermediate variable c.

Next function applied to c is a step called "Addroundkey", that consists in mixing c with the key (or a specific byte processed from the key) $k_0$, via a XOR operation, to generate $y_0$, that will be used as an input of the subsequent iteration.

Figure 5B:
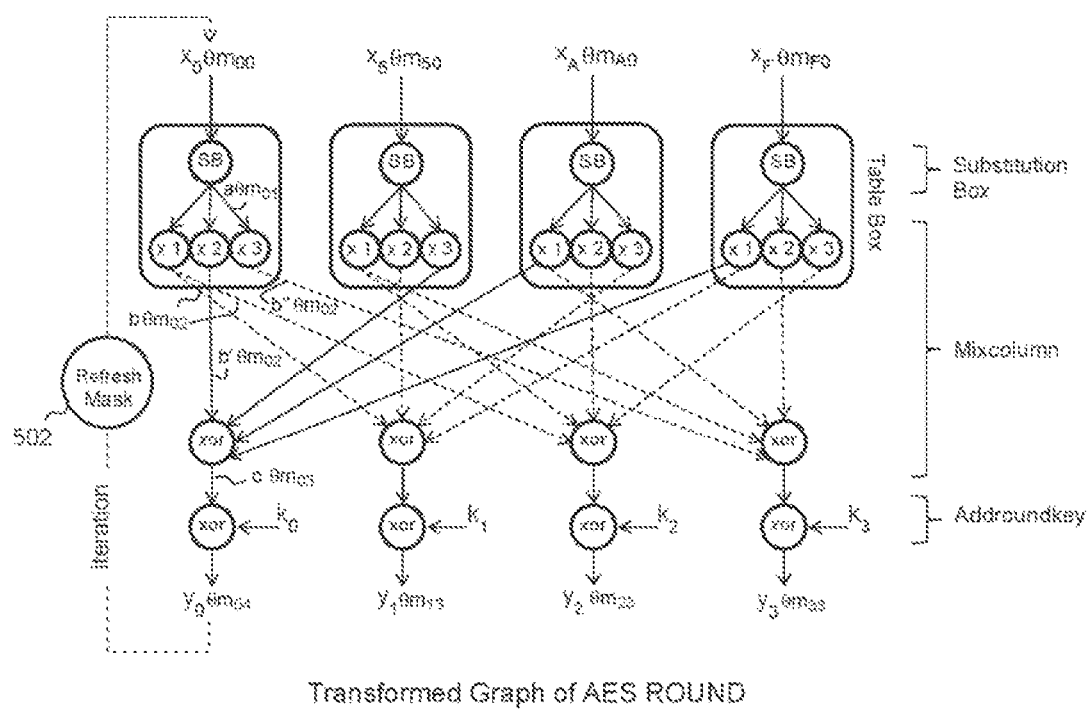
FIG. 5b is the corresponding protected call graph generated according to one embodiment of the invention.

FIG. 5b is a call graph representation of the AES algorithm of FIG. 5a, after it has been protected according to one embodiment of the invention.

As $x_0$ is an intermediate variable, it is masked by mask $\theta m_{00}$. This mask can be a XOR performed between $x_0$ and a known, random value, but it can also be a multidimensional share, meaning that a plurality of mask layers are applied. In the latter case, $\theta m_{00}$ is not necessarily a byte (8 bits) share, but can be a share of any dimension. It can also be a pair, a triplet or any other association of masks having the same or different sizes.

After being processed in the S-box step, the intermediate variable α is masked by mask $\theta m_{01}$. As the substitution box is a non-linear function, it must be replaced by an equivalent match table that all in once removes mask $\theta m_{00}$, perform the non-linear function, and mask the result with mask $\theta m_{01}$, as illustrated in FIG. 3. Thus, $\theta m_{01}$ is not necessarily related to $\theta m_{00}$.

After performing the times 1, times 2 and times 3 operations, the intermediate variable b may be masked by mask $vm_{02}$. In some embodiments, the mask may be equal to $\theta m_{01}$, or the functions may be replaced by an equivalent match box, so that $\theta m_{02}$ can be chosen as totally independent of $\theta m_{01}$.

In another embodiment, an equivalent match table 501, performing the operations of the substitution box and the times 1, times 2 and times 3 operations, may be calculated. The match table may have one input ($x_0 \theta m_0$) and three outputs ($b\theta m_{02}$, $b'\theta m_{02}$, $b''\theta m_{02}$). Alternatively three match tables may be calculated, each of them having one input and one output. The substitution box as regrouped with the time 1, times 2 and times 3 operators in a match table represents an operation called "T-box" (Table box) when non-encrypted.

In another embodiment, different masks may be assigned to each of the intermediate variable b, b' and b".

The step of mixing the results of the calculations performed over the various bytes, is a linear function. As a consequence, the output mask $\theta m_{03}$ can be retrieved from the masks $\theta m_{01}$, $\theta m_{51}$, $\theta m_{A1}$, and $\theta m_{F1}$ of the inputs ($\theta m_{51}$, $\theta m_{A1}$, and $\theta m_{F1}$ being the mask respectively associated with the output of the T-box calculation for processing the variables $x_5$, $x_A$ and $x_F$). However, an equivalent match table may be calculated, which allows choosing an output mask $\theta m_{03}$ that is totally independent from the input masks.

In the next step, intermediate variable $c\theta m_{03}$ is mixed with key $k_0$. As the key is not a variable but a constant, the key is not required to be masked. The result of the mixing is $y_0 \theta m_{04}$. As the mixing operation is linear, $\theta m_{04}$ is related to $\theta m_{03}$ or can be totally independent if the mixing function is replaced by an equivalent match table.

Finally, a refresh node 502 may be inserted. The first purpose of the refresh node is to ensure the consistency of the protected call graph by converting $\theta m_{04}$ into $\theta m_{00}$, as the variable $y_0/x_0$ is used as input/output of an iterative part of the call graph. In some embodiments, the refresh mask can be further associated with a step of changing the mask for at least some of the internal variables belonging to the iteration loop (being in that case masks $\theta m_{00}$, $\theta m_{01}$, $\theta m_{02}$, $\theta m_{03}$, and $\theta m_{04}$).

When the nodes of the linear functions are inherited from their parent nodes, it is possible to only refresh the mask(s) of the variables that are inputs of the loop ($\theta m_{00}$ in FIG. 5a) and the masks of variables that are output(s) of non-linear function(s) ($\theta m_{01}$ or $\theta m_{02}$ in FIG. 5b, depending on the embodiment). This implies modifying the associated equivalent tables to ensure the call graph consistency. The refreshed masks will automatically be propagated to the inputs/outputs of the linear functions.

It should be noted that the refresh node 512 is optional. Another way of guarantying the consistency of the protected call graph may consist for example in choosing $\theta m_{04}$ equal to $\theta m_{00}$.

Figure 6:
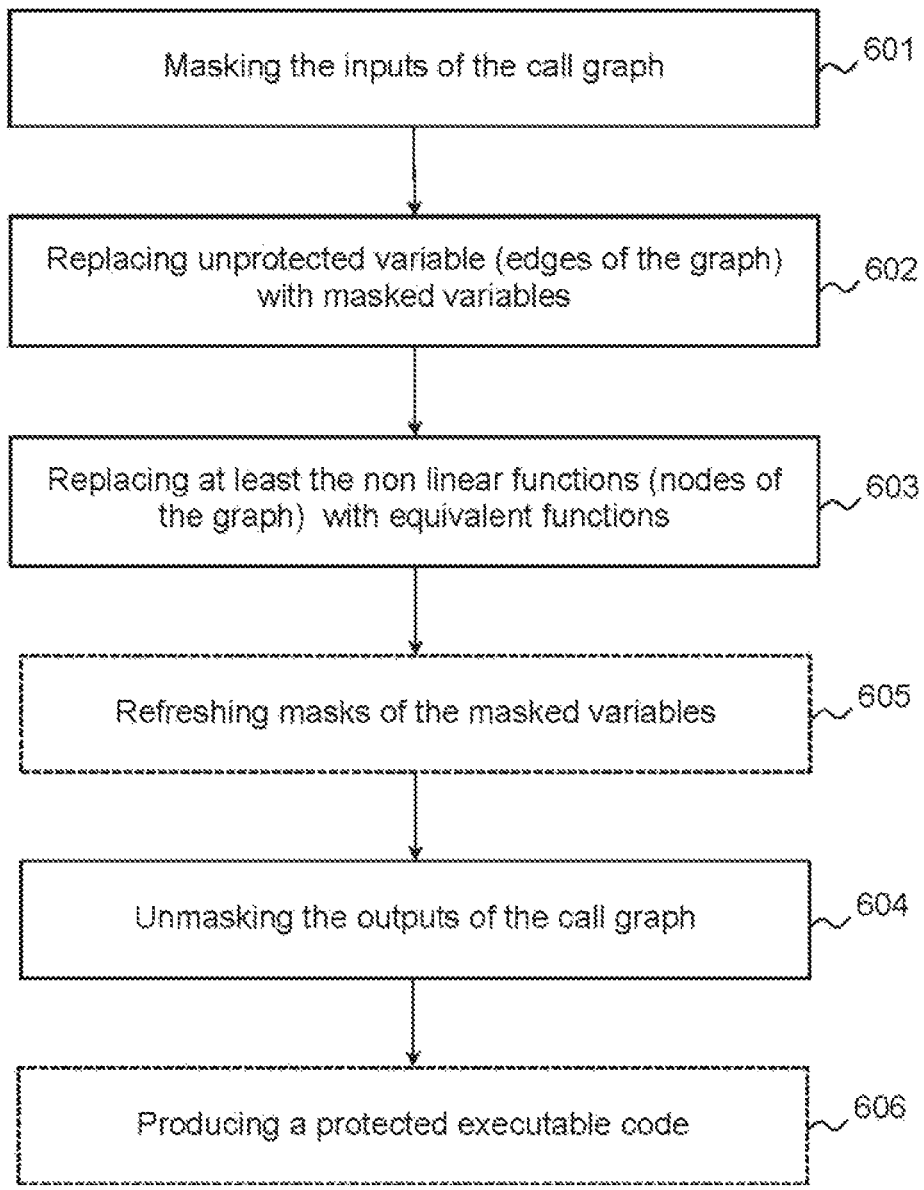
FIG. 6 is a flowchart depicting the computer implemented method according to certain embodiments.

FIG. 6 is a flowchart depicting the computer implemented method according to certain embodiments.

The method comprises:
- a step 601 of masking the inputs of the call graph, to produce masked inputs;
- a step 602 of replacing the unprotected variables of the graph, which are represented by the edges of the graph, by masked variables. The mask of the masked variables can be selected randomly, or can be the result of the use of a linear function over masked variables;
- a step 603 of replacing at least the non-linear functions of the call graph, which are represented by the nodes of the graph, by equivalent functions, so that it performs the same operations as the initial function, while taking into account the masks affecting the input/output of the function. This operation can also be performed on linear functions of the call graph. One possible implementation consists in replacing the function by a match table that is generated considering the masks affecting the inputs/outputs, and associating output values to each possible combination of input values; and
- a step 604 of unmasking the outputs of the call graph.

The method according to the invention may comprise an additional optional step 605 of modifying the iterative parts of the graph so that the masked inputs and variables are refreshed (meaning that the value of the mask is modified) at each iteration of the loop or at a slower rate, at regular intervals or randomly. Thus, variables iteratively calculated are never protected with the same mask. Although not limited to such applications, the method according to this embodiment has particular advantages when applied to cryptographic algorithms, which often comprise a large number of iterations performed over small calculations.

The methods described herein can be implemented by computer program instructions supplied to a processor of any type or any software programmable machine, as for instance a microprocessor, microcontroller, or DSP, to produce a machine that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

The method can be used standalone, in order to generate a protected representation of an algorithm from an unprotected one, but can also be paired with a compiler, thereby producing a protected compiled code that can be executed by a calculation machine, or a hardware code, in the form of a netlist generated by the compiler and implemented on a dedicated calculation machine, as for example a Field Programmable Gate Array (FPGA), or an Application Specific Integrated Circuit (ASIC).

To this end, the method may comprise an additional step 606 of compiling the protected call graph to produce an executable code that is robust to cryptanalysis and content recovery attacks.

Figure 7:
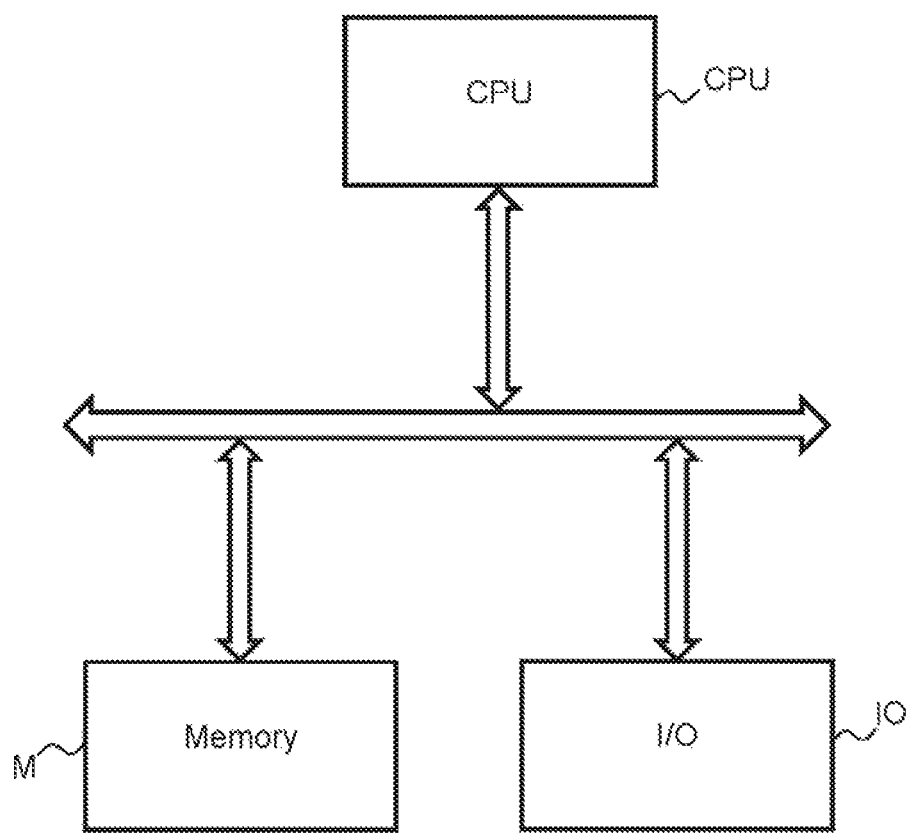
FIG. 7 illustrates a system that can be used to process the invention.

FIG. 7 illustrates a system, such as for instance a general-purpose computer system, that can be used to process the invention. The system comprises a non volatile computer-readable memory M, where the computer program product is stored, an input/output interface I/O, to retrieve an unprotected call graph, or unprotected data like source code or executable code that are processed by the processor CPU to generate a call graph, the processor being connected to the memory and input/output interface by way of data buses.

More generally, the methods and devices described herein may be implemented by various means. For example, these techniques may be implemented in hardware, software, or a combination thereof.

The various embodiments of the invention provide several advantages including the following:
- they present a high level approach, non correlated to the implementation,
- they provide robustness to an algorithm against all kinds of side channel attacks as, remarkably, all the variables processed by the algorithm are masked while the semantic of the algorithm is preserved,
- they are applicable to any type of software program, to linear and non-linear functions,
- they are quite easy to implement and to compile,
- they do not present information leakages, as all the variables are masked,
- they can be programmed to be executed automatically, without involving a human operator.

While embodiments of the invention have been illustrated by a description of various examples, and while these embodiments have been described in considerable details, it is not the intent of the applicant to restrict or in any way limit the scope of the appended claims to such details. Additional advantages and modifications will readily appear to those skilled in the art. The invention in its broader aspects is therefore not limited to the specific details, representative methods, and illustrative examples shown and described.

The invention claimed is:

1. A method performed by an apparatus comprising at least a processor and at least a memory for transforming a call graph representation of an algorithm into a secured call graph representation of said algorithm, the call graph comprising at least one input, at least one edge, at least one node and at least one output, the edges of the call graph representing internal variables of said algorithm, the nodes of the call graph representing linear or non-linear elementary functions of the algorithm, the method comprising:
    masking each input of the call graph,
    replacing each unmasked internal variable of the call graph with a masked variable,
    replacing at least each non-linear function of the call graph with an equivalent function that applies to masked variables,
    unmasking each output of the call graph.

2. The method of claim 1, wherein the call graph comprises parts processed iteratively, the replacing unmasked internal variables by masked internal variables comprising identifying internal variables used both as input and output of parts of the call graph processed iteratively, and using for these variables the same mask in input and output of said part of the call graph.

3. The method of claim 1, wherein the call graph comprises parts processed iteratively, the replacing unmasked internal variables by masked internal variables comprising identifying internal variables used both as input and output of parts of the call graph processed iteratively, and inserting in a feedback edge of said iterative parts additional nodes for modifying the masks of said internal variables.

4. The method of claim 1, wherein the masks of internal variables in parts of the call graph processed iteratively are changed at regular intervals, and the associated functions modified accordingly.

5. The method of claim 4, further comprising inserting in the call graph additional nodes for refreshing the masks of the internal variables of said iterative parts.

6. The method of claim 1, wherein the equivalent functions calculated during the replacing at least each non-linear function of the call graph with an equivalent function that applies to masked variables, are implemented using match tables.

7. The method of claim 1, wherein the replacing at least each non-linear function of the call graph with an equivalent function that applies to masked variables further comprises replacing each linear function of the call graph by an equivalent function.

8. The method of claim 1, wherein all the mask values are determined randomly.

9. The method of claim 1, further comprising compiling said call graph to produce a protected executable code.

10. A computer program product, stored on a non-transitory computer-readable data-storage medium, comprising computer-executable instructions when executed by the at least a processor, causing the apparatus to carry out the method according to claim 1.

11. A system comprising at least a processor and at least a memory, the memory storing computer-executable instructions to cause the system to carry out a computer implemented method for transforming a call graph representation of an algorithm into a secured call graph representation of said algorithm, the call graph comprising at least one input, at least one edge, at least one node and at least one output, the edges of the call graph representing internal variables of said algorithm, the nodes of the call graph representing linear or non-linear elementary functions of the algorithm, the system comprising a processing device configured to:
- mask each input of the call graph,
- replace each unmasked internal variable of the call graph with a masked variable,
- replace at least each non-linear function of the call graph by an equivalent function that applies to the masked variables, and
- unmask each output of the call graph.

* * * * *